Oct. 27, 1936.  L. G. HARTDORN  2,058,445

CLUTCH CONTROL SYSTEM FOR MOTOR VEHICLES

Filed Dec. 22, 1931  2 Sheets-Sheet 1

INVENTOR.
Louis G. Hartdorn
BY
ATTORNEY

Oct. 27, 1936.  L. G. HARTDORN  2,058,445
CLUTCH CONTROL SYSTEM FOR MOTOR VEHICLES
Filed Dec. 22, 1931  2 Sheets-Sheet 2
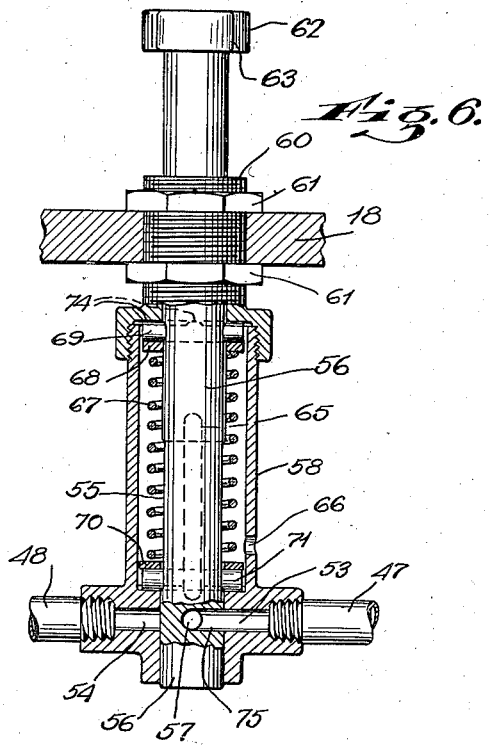
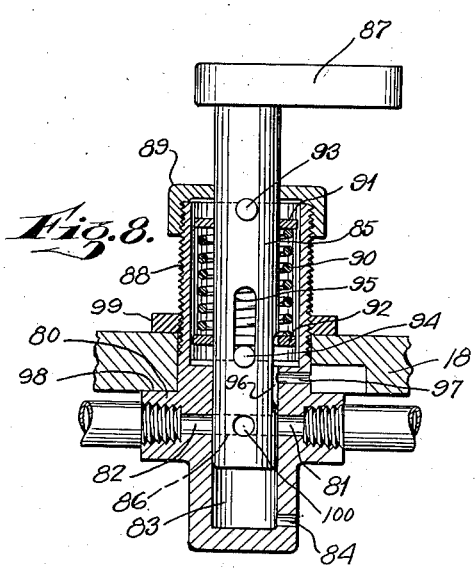
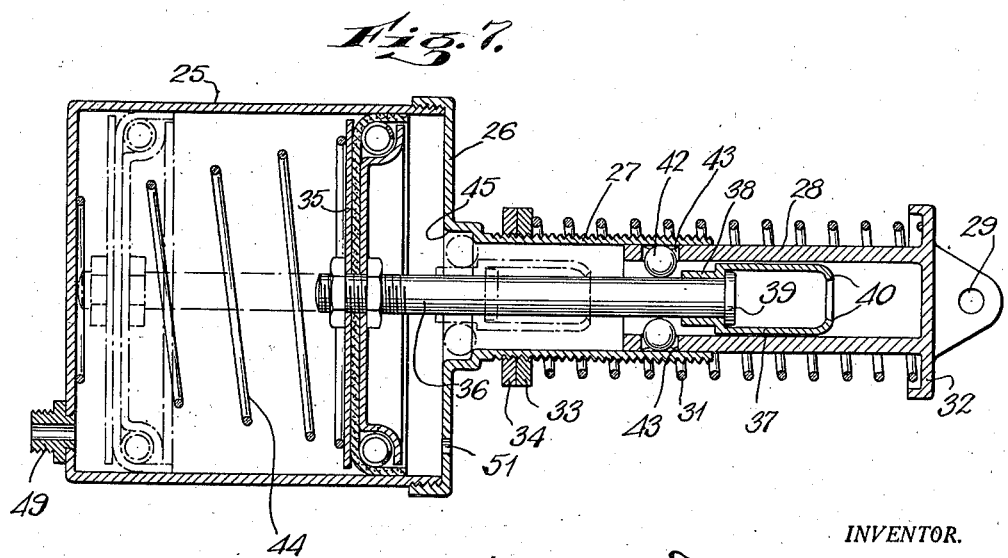
INVENTOR.
LOUIS G. HARTDORN
ATTORNEY Patented Oct. 27, 1936

2,058,445

UNITED STATES PATENT OFFICE 2,058,445

CLUTCH CONTROL SYSTEM FOR MOTOR VEHICLES

Louis G. Hartdorn, Forest Hills, N. Y.

Application December 22, 1931, Serial No. 582,554

13 Claims. (Cl. 192—.01)

My invention relates to the power drive of motor vehicles and has for an object to provide an automatic clutch control therefor.

Recently so-called "free wheeling" systems have been introduced in automobiles wherein the drive shaft of the vehicle is normally disconnected from the engine and is connected thereto only when the accelerator pedal is depressed or when the free wheeling system is intentionally thrown out of operation. In a certain class of "free wheeling" apparatus, use is made of the standard pedal-operated clutch, means being provided to operate the clutch under control of the accelerator pedal.

My invention is particularly applicable to said class but it is not limited to use with the standard pedal-controlled clutch.

An object of my invention is to employ a clutch-disengaging device operated by suction of the engine and means operable by actuation of a throttle control, such as an accelerator pedal, to disconnect such device from suction and to restore the clutch to engaging position.

Another object of my invention is to provide a very convenient means for rendering the clutch-control device inactive whenever so desired.

Another object is to provide a lost motion between the accelerator pedal and the means for disconnecting the clutch-control device from suction so that the engagement of the clutch may precede the operation of the throttle.

Another object of the invention is to provide an automatic lock for the clutch-control device so that the latter will not be affected by variations of suction, the lock being adapted to release only when the suction is reduced to a predetermined value or practically to zero.

Another object of the invention is to provide for unhampered operation of the clutch pedal when the clutch control device is disconnected from suction.

Further objects of the invention will appear in the following description of a preferred embodiment and thereafter the novelty and scope of the invention will be pointed out in the claims.

In the accompanying drawings;

Fig. 6 is a view of the valve shown in Fig. 3 but with the control element thereof turned through an angle of 90 degrees;

Fig. 7 is a view in longitudinal section of the clutch-control device; and

Fig. 8 is a view in longitudinal section of a modified form of valve in the suction line of the clutch control device.

Figure 1:
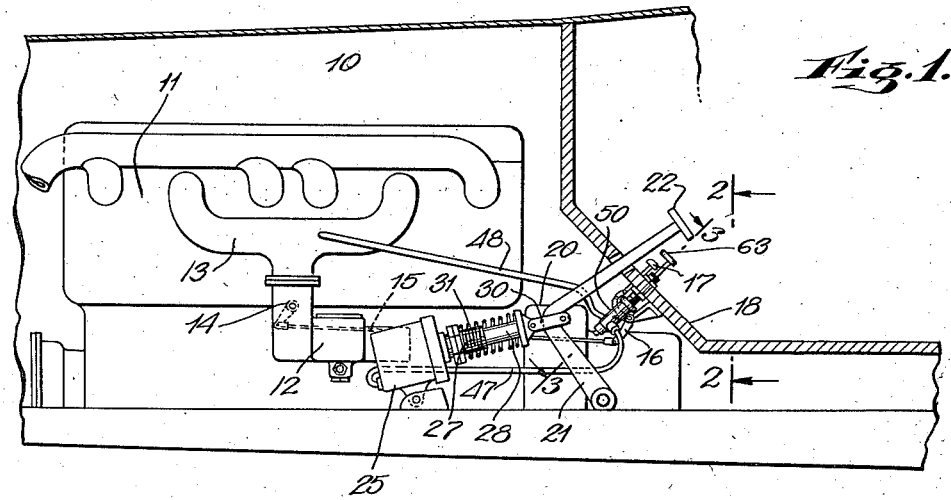
Figure 1 is a fragmental view in longitudinal section of the fore part of a motor vehicle, showing my improved clutch-control system installed therein.

In Fig. 1, I show a portion of a motor vehicle 10, including the engine 11 thereof. The engine is provided with a carburetor 12 and an intake manifold 13. A throttle valve 14 is provided in the manifold and a pull rod 15 runs from the throttle valve to a lever 16 which is controlled by an accelerator pedal 17 projecting through the pedal board 18 of the vehicle. Adjacent the accelerator pedal is a foot rest 19, Fig. 2. The engine is provided with a standard clutch which is indicated generally by the reference numeral 20. This clutch is operated by a lever 21 which projects through the foot board and is fitted with a pedal head 22.

The clutch-control device comprises a cylinder 25 hinged to a fixed part of the vehicle. This cylinder (see Fig. 7) is in the form of a cup opening toward the rear of the vehicle and is closed by a cap 26 which is formed with a central rearwardly extending sleeve 27. Fitted to slide in this sleeve is a telescoping sleeve member 28. This sleeve member is formed at its outer end with an eye 29 which is connected by a shackle 30 to the clutch lever 21 (as shown in Fig. 1). A spring 31 bears at one end against a flange 32 formed on the outer end of the member 28 and the opposite end of the spring abuts against a nut 33 threaded upon the sleeve extension 27. A jam nut 34 serves to lock the nut 33 at the desired adjustment on the member 27.

Fitted to slide in the cylinder 25 is a piston 35. The latter has a stem 36 which extends outward into the telescoping sleeve 28. Fitted to slide upon the stem is a thimble 37. This thimble is of stepped form, having a reduced portion 38 which has sliding engagement with the body of the stem. The stem is also formed with a head 39 which has free play within the enlarged portion of the thimble. However, the head cannot pass out of the thimble because the outer end of the thimble is crimped as shown at 40.

A set of balls 42 is carried by the telescoping sleeve member 28, the latter being formed with an annular series of openings 43 therethrough to receive the balls. The balls, however, normally fit between the stem 36 and the sleeve extension 27. A compression spring 44 is located between the piston 35 and the forward wall of the cylinder and tends to force the piston to the position shown in full lines in Fig. 7. When, as will be explained later, the piston is moved toward the left, as viewed in the drawings, it draws the thimble with it and the left hand end of the reduced part 38 of the thimble engages the balls and pulls the telescoping sleeve also toward the left. At the point where the sleeve extension 27 joins the cap 26 the bore of the extension is enlarged to form an annular recess 45. When the balls 42 have been drawn as far as this recess they will be spread outwardly thereinto by the part 38 of the thimble. This will lock the telescoping sleeve member 28 in its retracted position because the balls cannot escape from the recess as long as they are spread outwardly thereinto by the thimble. This locked position will be retained even when the piston moves outward or toward the right as shown in Fig. 7, because there is a lost motion between the stem 36 and the thimble 37. Not until the piston has moved far enough for the head 39 to engage the crimped end 40 of the thimble and draw the spreader 38 clear of the balls, will it be possible for the balls to slip out of the recess 45 and permit the spring 31 to restore the telescoping member 28 to its normal extended position.

The piston 35 is operated in the cylinder 25 by suction from the engine of the motor vehicle. A suction line is provided which consists of two pipes 47 and 48, respectively. The pipe 47 runs from a port 49 in the cylinder to a control valve 50 and the pipe 48 runs from said valve to the intake manifold 13, communicating with the latter at a point between the throttle valve 14 and the engine proper. When the valve 50 is in position to connect pipes 47 and 48, suction of the engine will draw the piston 35 to the position shown in broken lines in Fig. 7. In the meantime air may enter the cylinder on the right hand side of the piston, as shown in Fig. 7, through a relief port 51.

Figure 3:
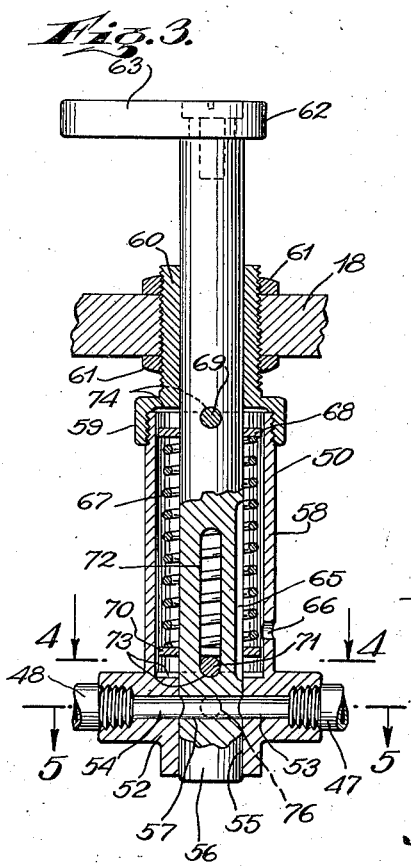
Fig. 3 is a view in longitudinal section of a valve in the suction line of the clutch control device, the section being taken on the line 3—3 of Fig. 1.
Figure 4:
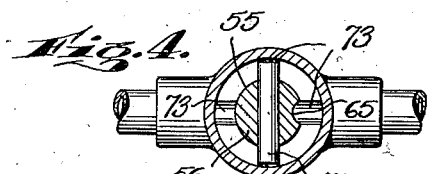
Fig. 4 is a view in section taken on the line 4—4 of Fig. 3.

Referring now to Fig. 3 the valve 50 comprises a valve body or casing 52 having a pair of opposed ports 53 and 54 therein. The port 53 is connected by the pipe 47 to the cylinder 25, while port 54 is connected by the pipe 48 to the intake manifold 13. These two ports communicate with a bore 55 in which is fitted a valve plunger 56. There is a transverse passage 57 in the valve plunger and when the plug is in the position shown in Fig. 3, ports 54 and 53 are connected by the passage 57 so that the cylinder 25 is connected to the intake manifold 13. However, the plunger may be turned to the position shown in Fig. 6 thereby interrupting communication between the ports 53 and 54.

Figure 2:
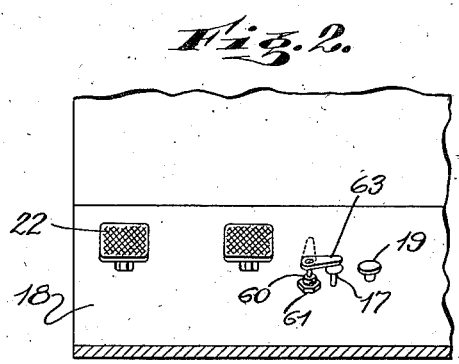
Fig. 2 is a view in section taken on the line 2—2 of Fig. 1 and showing a portion of the pedal board of said motor vehicle.

The valve plunger is adapted not only to turn but also to slide axially and it extends upwardly through a tubular extension 58 forming part of the valve casing 52. The upper end of the tubular extension has a cap 59 screwed thereon and this cap is formed with a bearing portion 60 for the upper part of the plunger 56. This bearing portion is externally threaded and is fitted with nuts 61 adapted to bear on opposite sides of the foot board 18 so as to hold the valve 50 in fixed position on said board. The plunger 56, however, projects from the outer face of the foot board and is fitted with a head 62 having a lateral extension or arm 63. When the device is in active position the arm 63 overlies the accelerator pedal 17, as shown in Fig. 2. When the arm 63 is in this position the plunger is in the position shown in Fig. 3, but the operator of the vehicle may turn the plunger to the position shown in Fig. 6 by kicking the arm 63 to the position shown by broken lines in Fig. 2. When the plunger is thus turned communication between the cylinder and the intake manifold is interrupted.

In the side of the plunger 56 there is a groove 65 which is so located that when the plug 56 is depressed and the port 54 is cut off by the body of the plunger this groove will establish communication between the port 53 and the outside air, there being a port 66 in the side of the tubular extension 58. This will permit air to enter the cylinder 25 through the pipe 47. The plunger 56 is normally held in raised position by a spring 67 which surrounds the plunger and is housed within the tubular extension 58. At its upper end the spring bears against a washer 68 which in turn bears against the projecting ends of a cross bar or pin 69 in the plunger. At its lower end the spring bears against a washer 70 and the latter bears against a pin 71 which passes through a slot 72 formed in the valve plunger. The pin 71 is seated in one of a pair of shallow grooves 73 formed in the valve body at the base of the extension 58 and when the plunger is in normal raised position the pin 69 is seated in one of a pair of shallow grooves 74 formed in the cap 59. The grooves 73 are disposed at right angles to each other as are also the grooves 74, and they serve to retain the plunger in either of the two positions shown respectively in Figs. 3 and 6.

Figure 5:
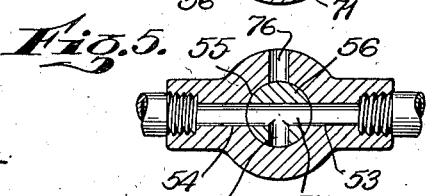
Fig. 5 is a view in section taken on the line 5—5 of Fig. 3.

Referring to Fig. 5 it will be observed that there is a lateral port 75 in the plunger communicating with the bore 55, and there is also an inlet port 76 in the valve body. When the valve plunger is turned to the position shown in Fig. 3, neither of these ports performs any function since they are both closed, but when the plunger is turned to the position shown in Fig. 6, the port 75 communicates with the port 53 and the port 57 with the port 76 so that the clutch controller is in communication with the outside atmosphere, while the suction line 48 is cut off by the body of the plunger 56 which closes the port 54.

The operation of the device is as follows: I shall assume first that the plunger has been turned to active position, namely, the position shown in Figs. 2 and 3 with the arm 63 overlying the accelerator button or pedal 17; also I shall assume that the engine 11 is running. Now since with the valve in active position the ports 53 and 54 are in communication, the suction of the engine will pull the piston 35 to the position shown in broken lines in Fig. 7. This will depress the clutch pedal 22 disengaging the engine from the drive shaft and in this position the clutch lever will be locked by the balls 42 which are forced out into the annular groove 45 by the spreader 38. The suction of the engine may then vary between wide limits without affecting the position of the clutch. If, however, the engine should stop the spring 44 would force the piston 35 outward, and as soon as the spreader 38 cleared the balls 42, the spring 31 would force the telescoping member 28 outward permitting the clutch to engage. If at the time the car was coasting, the momentum of the car would serve to restart the engine and the clutch would then again be disengaged by the suction of the engine. Whenever the operator wishes to re-engage the clutch all he needs to do is to press the arm 63 downward, thereby depressing the valve plunger 56 and interrupting communication between ports 53 and 54. This will also establish communication between the cylinder 25 and the outside atmosphere by way of the suction line 47, port 53, groove 65 and port 66. The spring 44 will then be free to force the piston 35 to the full line position shown in Fig. 7, and the spring 31 will then restore the clutch pedal to its normal position and the clutch to engaging position.

In practice a slight clearance is provided between the arm 63 and the accelerator pedal 17 so that the clutch may be returned to engaging position without depressing the accelerator pedal, or if it be desired to depress the accelerator pedal there will be time for the clutch control device to release before the engine is speeded up. The operator may now apply further pressure to the arm 63 to depress the accelerator button 17 at will, but as soon as he takes his foot off the arm 63, the plunger will be restored to the position shown in Fig. 3 by the spring 67 and the clutch controller will immediately be connected to the intake manifold 13 of the engine, so that the clutch will be disengaged and the car will coast.

If at any time the operator wishes to use the engine as a brake, for instance, in going down a steep hill, all he needs to do is to kick the arm 63 to the position shown in broken lines in Fig. 2. This will turn the valve plunger to the position shown in Fig. 6, and will close the port 54 while opening the port 53 to the outside atmosphere by way of ports 75, 57 and 76. This cuts out the free wheeling feature and the engine may then be controlled in the usual manner.

The clutch pedal 22 may be depressed to disengage the engine whenever desired without moving the piston 35 from the full line position shown in Fig. 7. This is due to the lost motion between the telescoping member 28 and the piston stem 36 and thus although a fairly heavy spring 44 may be used to restore the piston 35 to its normal position, the operator does not have to compress this spring when depressing the clutch pedal with his foot.

It will be observed that my invention provides for immediate release of the clutch pedal and engagement of the clutch as soon as the ball lock is released. This is of importance when traveling in traffic because it permits of quick operation and rapid speeding up of the car. However there is a pneumatic cushioning effect controlling the movement of piston 35 by reason of the fact that the only escape for air trapped between said piston and the end wall 26 is by way of port 51. This prevents violent jerking due to too sudden an engagement of the clutch.

A modification of my invention is shown in Fig. 8. Here the valve is similar to that shown in Figs. 3 and 6, but is particularly adapted for use as a foot rest, the head of the valve plunger taking the place of the usual foot rest 19. The valve comprises a valve body 80 formed with opposed ports 81 and 82 which provide communication with the pipes 47 and 48 respectively of the suction line. The ports 81 and 82 open into a bore 83 which may be closed at its lower end, but, is provided with an air relief opening 84. In the bore 83 is fitted the valve plunger 85 which has a transverse port 86 adapted to provide communication between the ports 81 and 82 when the valve is in active position. The upper end of the plunger is provided with a T-head 87, this form being preferred so as to permit of turning the valve from active to inactive position and vice versa. Rising from the valve body is a tubular extension 88 which is closed at its upper end by a cap 89 providing a bearing for the valve plunger 85. A spring 90 holds the plunger normally in raised position, this spring bearing against the washer 91 at its upper end and a washer 92 at its lower end. The washer 91 bears against a pin projecting from the plunger 85 and this pin is seated in either of a pair of shallow grooves formed in the cap 89. The washer 92 bears against a pin 94 which passes through a slot 95 in the plunger 85 and bears against either of a pair of shallow grooves formed in the valve body. In one side of the plunger 85 there is a groove 96 which is adapted to provide communication between the port 81 and a port 97 in the valve body when the plunger 85 is depressed.

It will be observed that the construction of this valve is very similar to that shown in Figs. 3 and 6 but since this valve is to be used as a foot rest it is not necessary to provide as long a travel for the plunger 85 and the parts are accordingly reduced in dimensions. The valve is attached to the pedal-board 18, the valve body being formed with a shoulder 98 which bears upon the under side of the pedal-board 18, while a nut 99 screwed on the sleeve 88 bears against the upper face of the pedal-board and clamps the valve thereto. The operation of this valve is similar to the one previously described except that in this case the head 87 serves as a foot rest and obviously when the operator wishes to depress the accelerator button 17, he will exert pressure on the plunger to depress the same and interrupt the suction line. If, however, he wishes to throw off the free wheeling feature all he needs to do is to turn the T-head 87 through an angle of 90-40 degrees, so as to close the port 82.

The plunger 85 has a lateral port 100 which communicates with the transverse port 86, and when the valve is turned to inactive position the port 100 communicates with the port 81 and the port 86 with a lateral port (not shown) through the valve body so that air may flow into the cylinder 25.

An advantage of the form of my invention shown in Fig. 7, lies in the fact that the operator may, if he chooses, depress the accelerator pedal 17 before applying sufficient pressure on the T-head 87 to interrupt the suction line. This will permit of bringing the engine up to the speed of a car before throwing in the clutch by depressing the T-head 87.

It will be understood that the two forms of my invention described above are to be taken as illustrative and not limitative of my invention and that I reserve the right to make various alterations, modifications and changes in form, construction and arrangement of parts without departing from the spirit and scope of the following claims.

I claim:—

1. The combination with an internal combustion engine having a clutch normally in engaged position, of means operable by suction of the engine for disengaging the clutch, and a lock for locking the clutch in disengaged position until the suction in said means is reduced to a predetermined minimum.

2. The combination with an internal combustion engine having a clutch normally in engaged position, of means operable by suction of the engine for disengaging the clutch, a lock for locking the clutch in disengaged position until the suction in said means is reduced to a predetermined minimum, and means operable at will to reduce the suction to said minimum.

3. The combination with an internal combustion engine having a clutch therefor normally in engaged position, of means operable by suction of the engine for disengaging the clutch, and a lock for locking the clutch in disengaged position until the suction in said means is reduced to a predetermined minimum, and means operable at will to restore the clutch to normal engaging position.

4. The combination with an internal combustion engine having a clutch and a pedal actuated accelerator, of means responsive to a running condition of the engine for moving the clutch to disengaged position, and a controller for releasing the clutch for movement to engaging position, said controller including a pedal for operating the same, the controller pedal being adjustable to overlie the accelerator pedal whereby depression of the latter may be effected by depression of the controller pedal.

5. The combination with an internal combustion engine having a clutch and a pedal operated accelerator, of means actuated by suction of the engine for moving the clutch to disengaged position, a valve operable to relieve the suction in said means and thereby release the clutch for movement to engaging position, a pedal for operating the valve located adjacent the accelerator pedal whereby both pedals may be operated simultaneously or individually with one foot, and stop means limiting depression of the valve pedal to a position in which it may serve as a rest for the foot when operating the accelerator pedal.

6. The combination with an internal combustion engine having a clutch and a pedal operated accelerator, of means actuated by suction of the engine for moving the clutch to disengaged position, and a controller adjacent the accelerator pedal and movable angularly to relieve the suction in said means and also depressible axially to relieve said suction, said controller including a pedal adapted to overlie the accelerator pedal whereby depression of the latter may be effected by axial depression of the controller, the controller pedal being movable angularly to clear the accelerator pedal and thereby turn the controller to relieve said suction.

7. The combination with an internal combustion engine having means for producing suction and having also a pedal operated accelerator and a clutch, of suction actuated mechanism for moving the clutch to disengaging position, a suction conduit connecting said mechanism to the suction producing means, a normally open valve in the conduit, said valve when closed preventing air flow through the conduit to said means and admitting air under atmospheric pressure to said mechanism, and an operating member for the valve depressible to close the valve and also angularly movable between two positions, the valve being open in one of said positions and closed in the other, said operating member being located adjacent the accelerator pedal for simultaneous operation therewith.

8. The combination with an internal combustion engine having means for producing suction and having also a pedal operated accelerator and a clutch, of suction actuated mechanism for moving the clutch to disengaging position, a suction conduit connecting said mechanism to the suction producing means, a normally open valve in the conduit, said valve when closed preventing air flow through the conduit to said means and admitting air under atmospheric pressure to said mechanism, an operating member for the valve depressible to close the valve and also angularly movable between two positions, the valve being open in one of said positions and closed in the other, said operating member being located adjacent the accelerator pedal for simultaneous operation therewith, and means for holding the operating member in either of said positions.

9. The combination with an internal combustion engine having means for producing suction and having also a pedal operated accelerator and a clutch, of suction actuated mechanism for moving the clutch to disengaging position, a suction conduit connecting said mechanism to the suction producing means, a normally open valve in the conduit, said valve having a plunger movable axially and also angularly to close the valve, thereby disconnecting said mechanism from suction and connecting said mechanism to atmosphere, and a crank arm on the plunger adapted to overlie the accelerator pedal when the valve is turned to open position.

10. The combination with an internal combustion engine having means for producing suctions and having also a clutch, of suction actuated mechanism for moving the clutch to disengaging position, a suction conduit connecting said mechanism to the suction producing means, a normally open valve in the conduit having a plunger depressible to close the valve and thereby disconnect said mechanism from suction and connecting said mechanism to atmosphere, said plunger being also movable angularly to open and close said valve, and retaining means for holding the plunger in either open or closed angular position.

11. The combination with an internal combustion engine having means for producing suction and having also a pedal operated accelerator and a clutch, of suction actuated mechanism for moving the clutch to disengaging position, a suction conduit connecting said mechanism to the suction producing means, a normally open valve in the suction conduit having a plunger depressible to close the valve and thereby disconnect said mechanism from suction and connect said mechanism to atmosphere, said plunger being also movable angularly from normal open position to close said valve, and retaining means for holding the plunger either in open or in closed angular position, said plunger being adjacent the accelerator pedal for simultaneous operation therewith by the foot of an operator.

12. The combination with an internal combustion engine having means for producing suction and having also a pedal operated accelerator and a clutch, of suction actuated mechanism for moving the clutch to disengaging position, a suction conduit connecting said mechanism to the suction producing means, a normally open valve in the suction conduit having a plunger depressible to close the valve and thereby disconnect said mechanism from suction and connect said mechanism to atmosphere, said plunger being also movable angularly from normal position to close said valve, retaining means for holding the plunger either in open or in closed angular position, and a crank arm on the plunger overlying the accelerator pedal when the plunger is in open angular position whereby depression of the accelerator pedal will result in closing said valve also.

13. The combination with an internal combustion engine having a clutch therefor normally in engaged position, of means operable by suction of the engine for disengaging the clutch, a lock for locking the clutch in disengaged position until the suction in said means is reduced to a predetermined minimum, means operable at will to restore the clutch to normal engaging position, and a cushioning means for controlling the rate of return of the clutch to engaging position.

LOUIS G. HARTDORN.